United States Patent
Sakaguchi et al.

(10) Patent No.: US 10,710,199 B2
(45) Date of Patent: Jul. 14, 2020

(54) METHOD OF MANUFACTURING TUBE, AND TUBE

(71) Applicant: MITSUBISHI HITACHI POWER SYSTEMS, LTD., Kanagawa (JP)

(72) Inventors: Tadakazu Sakaguchi, Tokyo (JP); Hirokazu Nishimura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/387,945

(22) Filed: Apr. 18, 2019

(65) Prior Publication Data

US 2019/0240779 A1    Aug. 8, 2019

Related U.S. Application Data

(62) Division of application No. 15/111,965, filed as application No. PCT/JP2015/050674 on Jan. 13, 2015, now Pat. No. 10,307,865.

(30) Foreign Application Priority Data

Jan. 23, 2014 (JP) ................. 2014-010717

(51) Int. Cl.
 *B23K 26/00* (2014.01)
 *B23K 26/282* (2014.01)
 (Continued)

(52) U.S. Cl.
 CPC ........ *B23K 26/282* (2015.10); *B23K 26/0823* (2013.01); *F16L 13/02* (2013.01); *F16L 13/0245* (2013.01); *B23K 2101/06* (2018.08)

(58) Field of Classification Search
 CPC . B23K 31/027; B23K 2101/06; B23K 26/282
 See application file for complete search history.

(56) References Cited

U.S. PATENT DOCUMENTS 1,745,492 A * 2/1930 Kelch ................ B60H 1/00335
165/51
8,070,088 B2 * 12/2011 Tortosa .................. B01D 63/10
242/573.3
(Continued)

FOREIGN PATENT DOCUMENTS

CN        2645841       10/2004
CN      102712061       10/2012
(Continued)

OTHER PUBLICATIONS

International Search Report dated Apr. 21, 2015 in International (PCT) Application No. PCT/JP2015/050674.

(Continued)

*Primary Examiner* — Erin B Saad
(74) *Attorney, Agent, or Firm* — Wenderoth, Lind & Ponack, L.L.P.

(57) ABSTRACT

A method of manufacturing a tube, and a tube, the method comprising the steps of: coupling in position a first tube body and a second tube body by inserting a first insert portion of a connecting pin into an end portion of a first hole of the first tube body and inserting a second insert portion into an end portion of a first hole of the second tube body; welding all around an outer circumferential portion of the coupled portion of the first tube body and the second tube body and all around an inner circumferential portion of the first holes in which the connecting pin is inserted; and removing the connecting pin remaining inside the first hole of the first tube body and the first hole of the second tube body.

6 Claims, 6 Drawing Sheets

(51) Int. Cl.
  *F16L 13/02* (2006.01)
  *B23K 26/08* (2014.01)
  *B23K 101/06* (2006.01)

(56) References Cited

U.S. PATENT DOCUMENTS

2001/0006120 A1  7/2001  Miyamoto et al.
2008/0279441 A1  11/2008  Matsuo
2013/0180472 A1  7/2013  Hino et al.

FOREIGN PATENT DOCUMENTS

| JP | 11-216594 | 8/1999 |
| JP | 2001-187992 | 7/2001 |
| JP | 2002-5379 | 1/2002 |
| JP | 2002-129867 | 5/2002 |
| JP | 2004-34060 | 2/2004 |
| JP | 2004-42049 | 2/2004 |
| JP | 2013-43201 | 3/2013 |
| KR | 10-2012-0101126 | 9/2012 |
| WO | 2012/007326 | 1/2012 |

OTHER PUBLICATIONS

Written Opinion of the International Searching Authority dated Apr. 21, 2015 in International Application No. PCT/JP2015/050674 (with English translation).
First Office Action dated Dec. 2, 2016 in Chinese Application No. 201580005555.8, with English translation.
Notification of Reasons for Refusal dated Jun. 6, 2017 on Japanese Application No. 2014-010717, with English translation.
Office Action dated Jan. 10, 2018 in Korean Application No. 10-2016-7020046, with English translation.
Office Action dated Nov. 14, 2018 in U.S. Appl. No. 15/111,965.
Notice of Allowance dated Mar. 8, 2019 in U.S. Appl. No. 15/111,965.

* cited by examiner

METHOD OF MANUFACTURING TUBE, AND TUBE

TECHNICAL FIELD

The present invention relates to a method of manufacturing a tube with a plurality of longitudinally oriented internal holes, and a tube manufactured by this method of manufacturing a tube.

BACKGROUND ART

Conceivable methods of manufacturing a tube with longitudinally oriented internal holes include, for example, a method of machining holes in a rod-like member using a tool such as a drill. However, when the rod-like member is long and the holes to be formed are small in diameter, a long and thin drill bit is used. Whirl that occurs at the tip of the drill bit when such a drill bit rotates limits the performance of the machining of holes. To combat this, holes can be cut in rod-like members shorter than a predetermined length, and by joining these rod-like members with the holes in a rectilinear manner, a tube of a predetermined length with internal holes can be manufactured.

Examples of such a method of manufacturing a tube include the technology in the Patent Documents described below. Patent Document 1 describes a method of manufacturing a hydroformed tube, the method comprising friction stir welding an abutment portion of a plurality of cylindrical metal pipes in a coaxial arrangement, with a thick-walled cylindrical backing jig made of rigid material being disposed inside the abutment portion to support the abutment portion. The friction stir welding is performed by a rotating tool and a pin, which are integrally rotated at high speeds and inserted into the abutment portion, traversing the abutment portion in the circumferential direction. Patent Document 2 describes joining two columns by welding end portions of the two columns, wherein joining is performed after a first engagement portion of a column backing metal is inserted in a top end portion of a lower column and fixed, a bottom end portion of an upper column is fitted to the outside of a second engagement portion of the column backing metal and fixed, and the upper and lower columns are abutted, mediated by the column backing metal.

CITATION LIST

Patent Documents

Patent Document 1: Japanese Unexamined Patent Application Publication No. 2004-042049A
Patent Document 2: Japanese Unexamined Patent Application Publication No. H11-216594A

SUMMARY OF INVENTION

Technical Problem

The conventional methods of manufacturing a tube described above are not suited to application in the manufacture of tubes having internal holes and meeting high-performance sealing requirements. To explain, conventional methods include abutting the end portions of two tubes mediated by a jig and joining this abutment portion by welding the outside thereof. Alternatively, in the case of joining two tubes with a plurality of internal holes, the end portions of the two tubes are abutted with a jig inserted in each of the holes. Then the abutment portion is joined by welding the outside thereof. With these methods, the outer circumferential portions of the joined tubes are joined at the abutment portion, but at the area around the holes, the end surfaces are simply abutted. As a result, sufficient sealing is not obtained. If different fluids were to flow through the holes of such a joined tube, the fluids would leak from the joined portion of the tube and the different fluids would mix.

In order to solve the problems described above, an object of the present invention is to provide a method of manufacturing a tube of a predetermined length with high-performance sealing between a plurality of internal holes, and a tube.

Solution to Problem

To achieve the object described above, a method of manufacturing a tube provided with a first tube body, which includes a plurality of holes, and a second tube body, which includes a plurality of holes, joined in a rectilinear manner, is a method comprising the steps of:

coupling in position the first tube body and the second tube body by inserting a first end portion of a connecting pin into an end portion of a hole of the plurality of holes of the first tube body and inserting a second end portion of the connecting pin into an end portion of a hole of the plurality of holes of the second tube body;

welding all around an outer circumferential portion of the coupled portion of the first tube body and the second tube body and all around an inner circumferential portion of the holes in which the connecting pin is inserted; and removing the connecting pin remaining inside the holes of the first tube body and the second tube body.

Accordingly, by welding all around the outer circumferential portion of the coupled portion of the tube bodies and all around the inner circumferential portion of the holes in which the connecting pin is inserted, the melt portion is formed between the holes, which ensures high-performance sealing. In addition, by removing the connecting pin remaining inside the holes of the tube bodies, the tube of a predetermined length can be easily manufactured.

In the method of manufacturing a tube according to the present invention, the connecting pin remaining inside the holes of the first tube body and the second tube body is cut to a diameter identical to that of the holes of the first tube body and the second tube body.

Thus, the connecting pin remaining inside the holes can be easily removed using the holes of the tube bodies acting as a guide. Additionally, by cutting the connecting pin to a diameter identical to that of the holes, highly precise holes of a predetermined length can be formed.

In the method of manufacturing a tube according to the present invention, the first tube body and the second tube body are each provided of a fitting hole with an inner diameter larger than that of the holes, the fitting hole being disposed on the end portion of the holes; and the connecting pin is provided with a pair of insert portions insertable in the holes of the first tube body and the second tube body and a fitting portion fittable with the fitting holes of the first tube body and the second tube body, the fitting portion being disposed between the pair of insert portions.

Thus, by the insert portions of the connecting pin being inserted into the holes of the tube bodies and the fitting portion being fit into the fitting holes of the tube bodies, the connecting pin is able to be inserted into the tube bodies an appropriate amount and the tube bodies with the connecting pin disposed inside can be appropriately welded from the outer circumferential portion.

In the method of manufacturing a tube according to the present invention, the coupled portion of the first tube body and the second tube body is welded to a width greater than a length of the fitting portion of the connecting pin.

Thus, all of the fitting portion of the connecting pin becomes the melt portion, thus ensuring sealing.

In the method of manufacturing a tube according to the present invention, the connecting pin is a solid member.

The solid connecting pin can prevent the holes from melting and deforming when welding is performed.

The method of manufacturing a tube according to the present invention further comprises the step of, subsequently to welding the first tube body and the second tube body, which each include a plurality of peripheral holes disposed on the outer circumferential portion side spaced at predetermined intervals in the circumferential direction, all around the outer circumferential portion of the coupled portion of the first tube body and the second tube body and all around the inner circumferential portion of the peripheral holes into which the connecting pin is inserted, forming a central hole by cutting a center portion of the first tube body and the second tube body to the melt portion.

By thus cutting the center portion of the first tube body and the second tube body to the melt portion to form the central hole, the joint portion of the first tube body and the second tube body constitutes entirely the melt portion, which ensures sealing.

A tube of the present invention comprises a first tube body including a plurality of holes; a second tube body including a plurality of holes, the tube bodies being joined in a rectilinear manner; and a melt portion formed all around the joint portion of the first tube body and the second tube body.

Thus, a predetermined length can be ensured, and high-performance sealing between the holes provided inside the tube bodies can be ensured.

Advantageous Effects of Invention

According to the method of manufacturing a tube, and the tube according to the present invention, a tube is manufactured by inserting the first end portion of the connecting pin into the end portion of the hole of the first tube body and the second end portion into the end portion of the hole of the second tube body, welding the coupled portion of the tube bodies all around the outer circumferential portion and all around the inner circumferential portion of the holes in which the connecting pin is inserted, and removing the connecting pin remaining inside the holes. The present invention can thus provide a tube of a predetermined length with high-performance sealing between the plurality of internal holes.

DESCRIPTION OF EMBODIMENTS

Preferred embodiments of a method of manufacturing a tube and a tube according to the present invention are described in detail below with reference to the accompanying drawings. However, the present invention is not limited by these embodiments, and, when there is a plurality of embodiments, encompasses combinations of these various embodiments.

Figure 1:
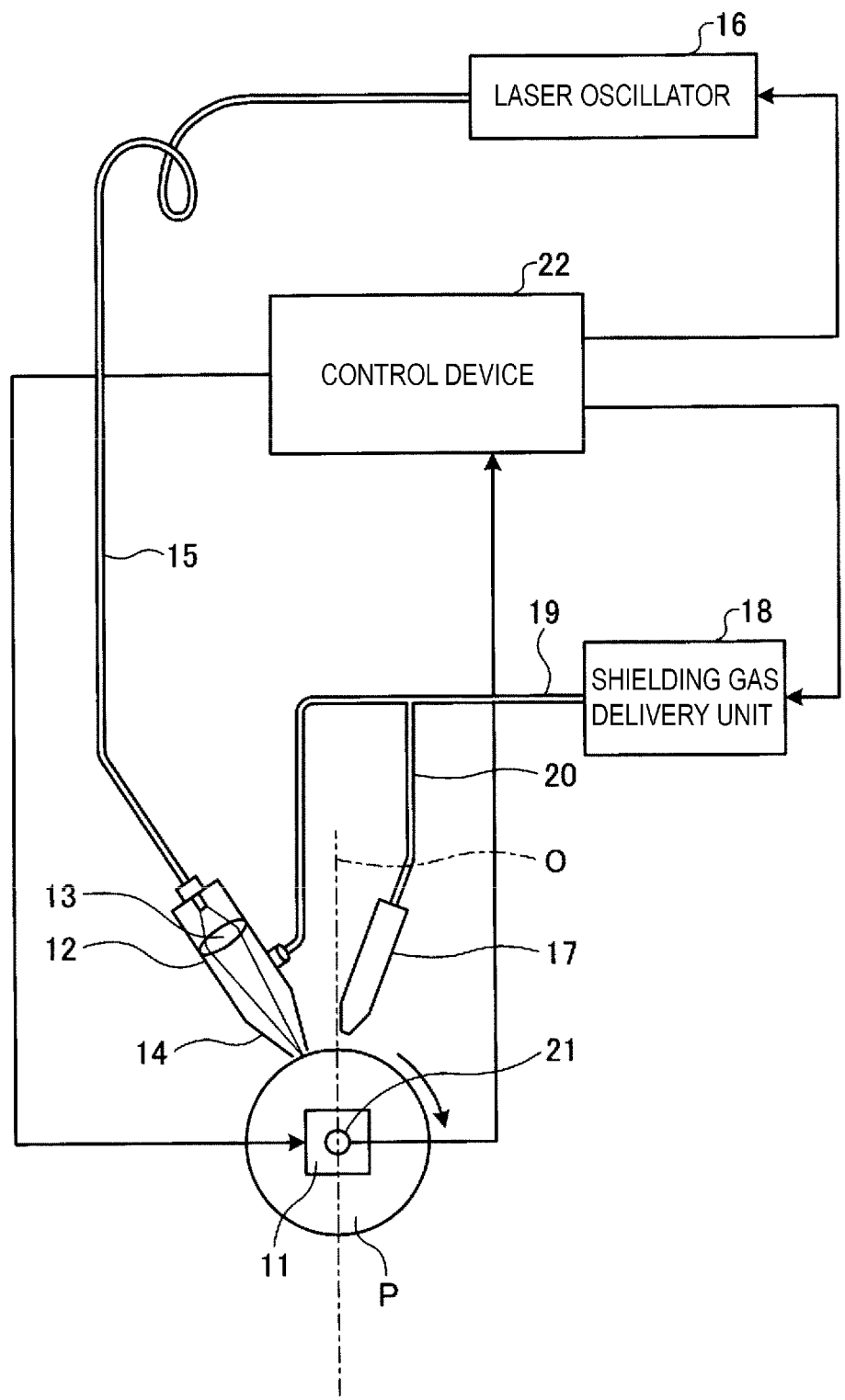
FIG. 1 is a schematic configuration diagram illustrating equipment for manufacturing a tube of the present embodiment.

FIG. 1 is a schematic configuration diagram illustrating equipment for manufacturing a tube according to the present embodiment.

As illustrated in FIG. 1, the equipment for manufacturing a tube according to the present embodiment includes a support (not illustrated) by which a tube P is supported, and a rotary driving unit 11 that supports the tube P in a manner allowing rotation in the direction of the arrow. A laser welding head 12 is disposed above the tube P. The laser welding head 12 includes an optical system 13 and a gas nozzle 14. The laser welding head 12 is connected to a laser oscillator 16 via a fiber-optic cable 15.

Additionally, a cooling nozzle 17 is disposed next to the laser welding head 12 above the tube P. A shielding gas delivery unit 18 is connected to the laser welding head 12 via a first delivery hose 19 and connected to the cooling nozzle 17 via a second delivery hose 20 that branches from the first delivery hose 19. In this configuration, the laser welding head 12 and the cooling nozzle 17 are disposed at symmetrical positions with respect to a vertical line O that passes through the center of the tube P.

A sensor 21 is provided that detects the rotational speed and rotational position of the tube P. A control device 22 is provided that controls the rotary driving unit 11, the laser oscillator 16, and the shielding gas delivery unit 18 in response to rotational speeds and rotational positions of the tube P detected by the sensor 21.

This configuration operates by the rotary driving unit 11 rotating the tube P while a laser beam, which is transmitted by the fiber-optic cable 15 and focused by the optical system 13, is emitted from the laser welding head 12 at an abutment portion of the tube P and shielding gas, which prevents oxidation of the weld portion (melt portion), is sprayed from the gas nozzle 14. Additionally, shielding gas is sprayed from the cooling nozzle 17 to cool the weld portion.

The method of manufacturing a tube according to the present embodiment comprises manufacturing a tube with a plurality of longitudinally oriented internal holes using the equipment for manufacturing a tube described above.

Figure 2:
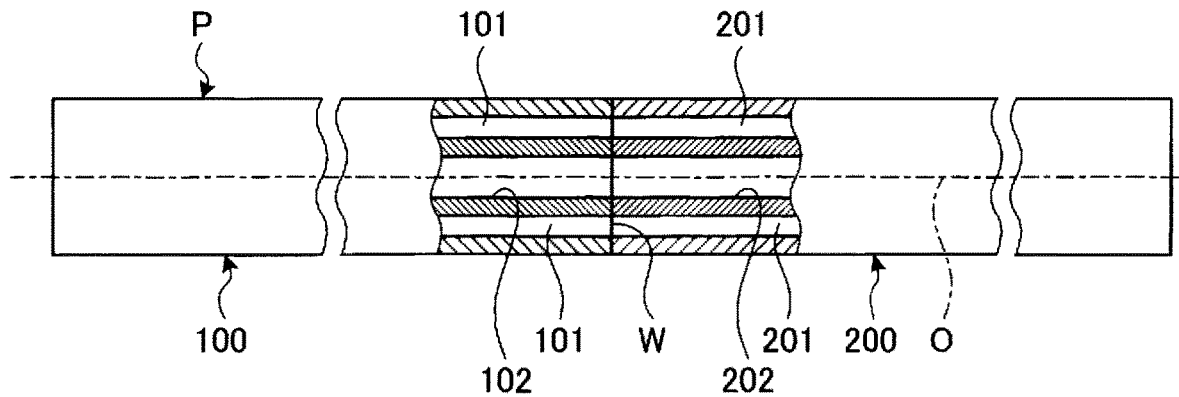
FIG. 2 is an elevation view of a tube of the present embodiment truncated.
Figure 3:
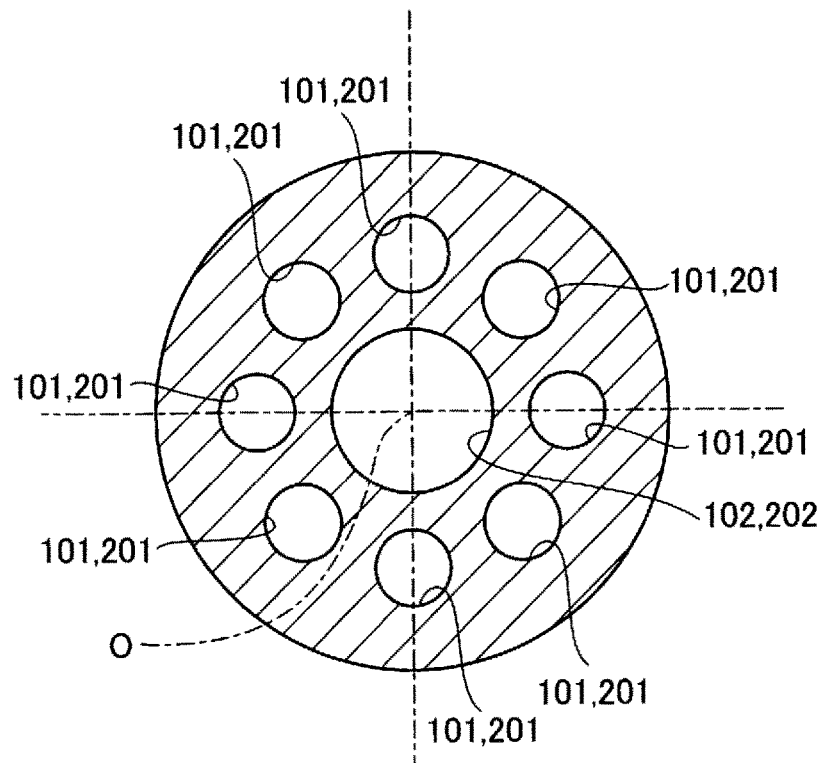
FIG. 3 is a cross-sectional view of the tube.

FIG. 2 is an elevation view of a tube according to the present embodiment truncated. FIG. 3 is a cross-sectional view of this tube.

As illustrated in FIG. 2, the tube P is constituted by a first tube body 100 including a plurality of holes 101, 102 (nine in the present embodiment), and a second tube body 200 including a plurality of holes 201, 202 (nine in the present embodiment). The tube bodies 100, 200 are connected in a rectilinear manner, the holes 101 and 201 and holes 102 and 202 communicate with each other while sharing a common center, and a melt portion (weld portion) W is formed all around the joint portion of the first tube body 100 and the second tube body 200. Here, the term "melt portion" is analogous with "weld portion" and refers to a region where the base material is melted and then solidified.

Here, the first holes (peripheral holes) 101, 201 are holes with a small diameter. The first holes 101, 201 are located an equal distance from the center O of the tube bodies 100, 200 and spaced an even distance from one another in the circumferential direction. The second holes (central holes) 102, 202 are holes with a diameter larger than that of the first holes 101, 201 located at the center O of the tube bodies 100, 200.

Now, the method of manufacturing a tube according to the present embodiment will be described in detail.

Figure 4:
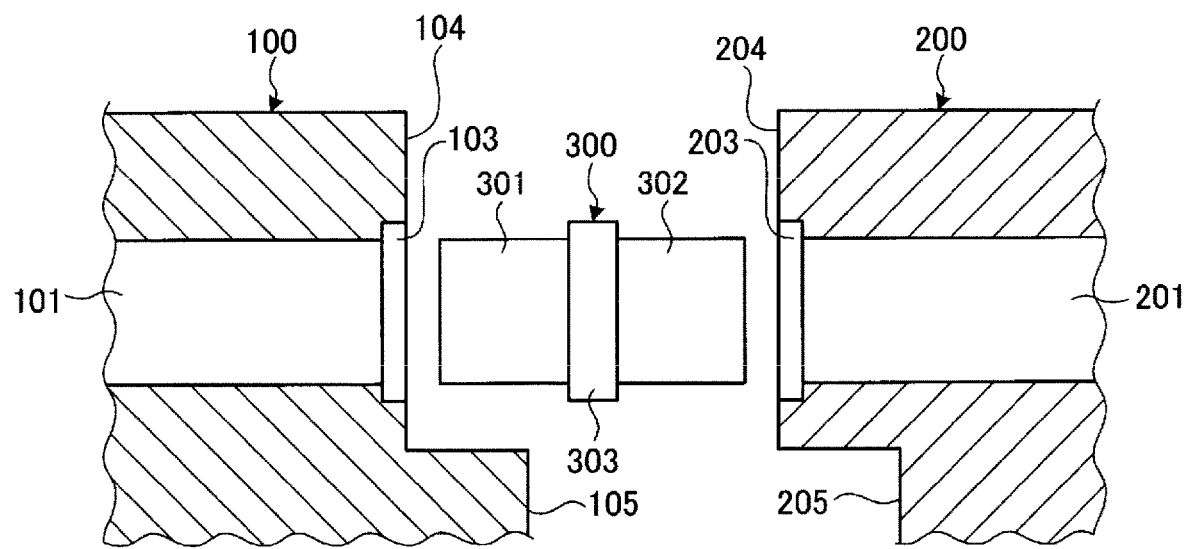
FIG. 4 is a schematic view illustrating a method of manufacturing a tube of the present embodiment.
Figure 5:
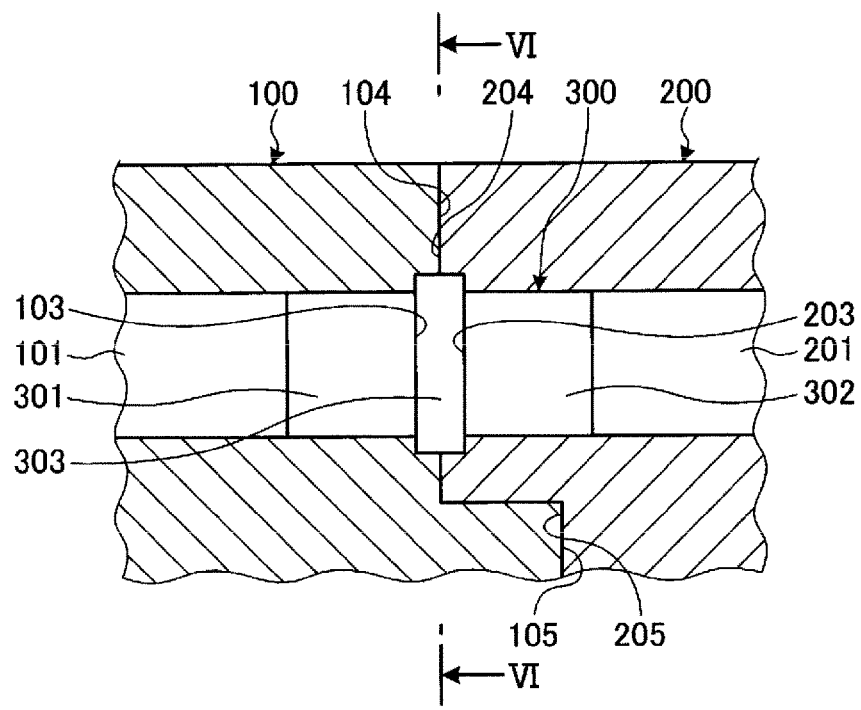
FIG. 5 is a schematic view illustrating the method of manufacturing a tube of the present embodiment.
Figure 6:
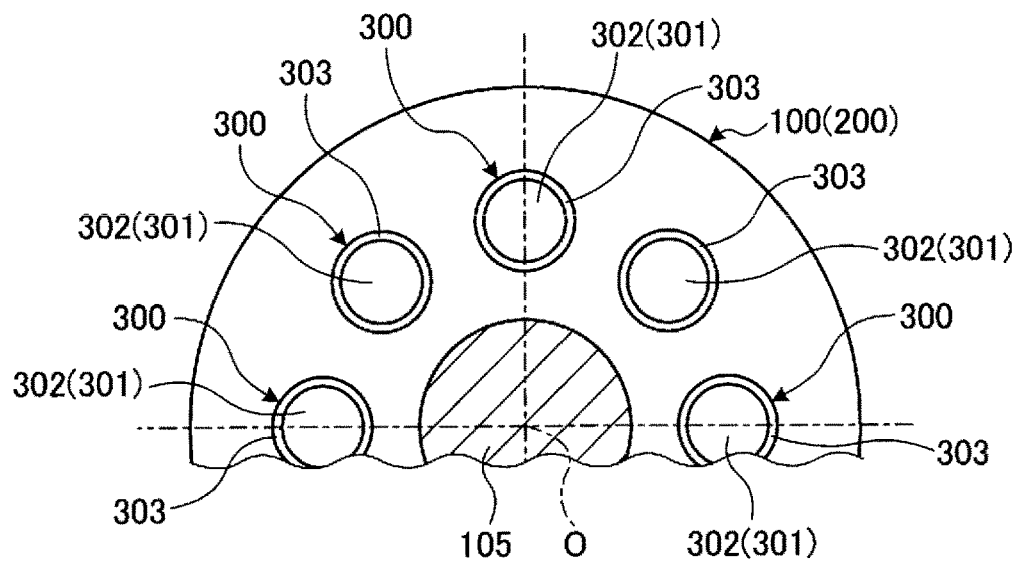
FIG. 6 is a cross-sectional view taken along a line VI-VI in FIG. 5.
Figure 7:
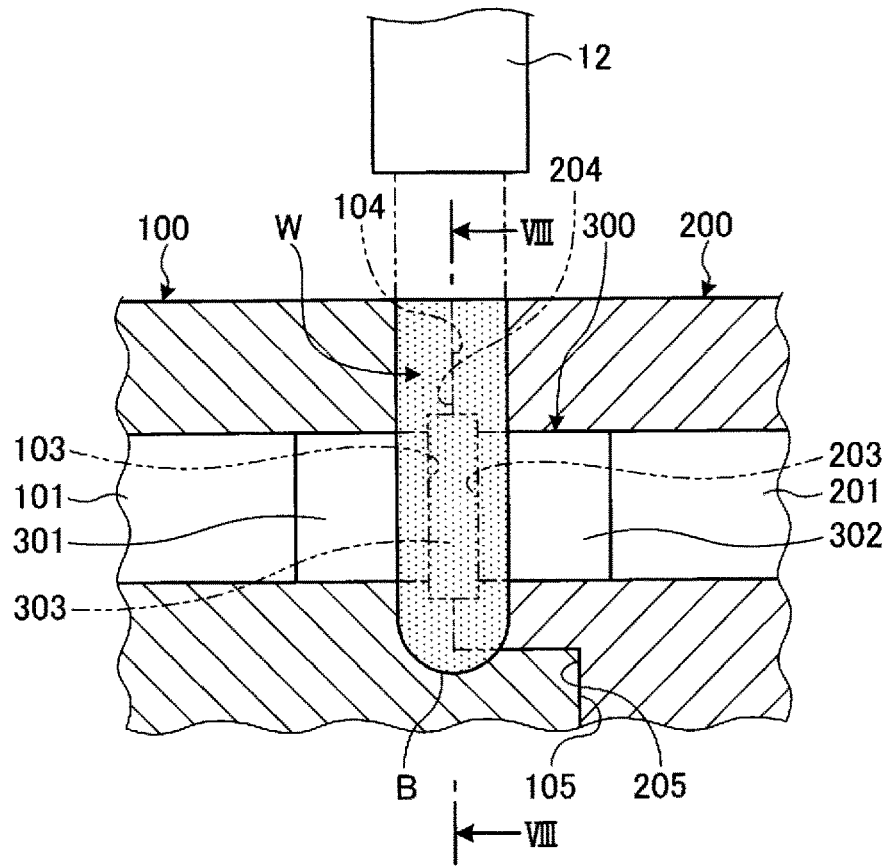
FIG. 7 is a schematic view illustrating the method of manufacturing a tube of the present embodiment.
Figure 8:
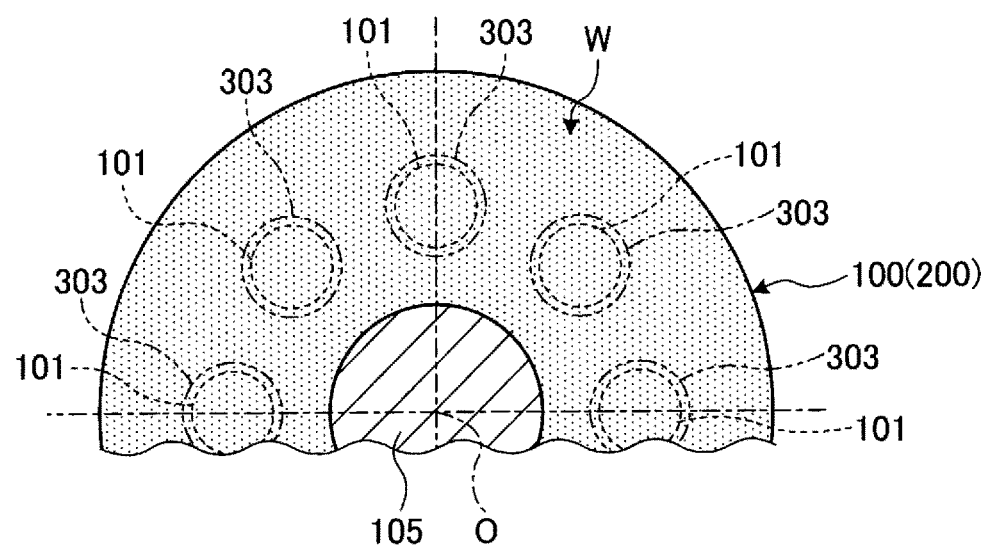
FIG. 8 is a cross-sectional view taken along a line VIII-VIII in FIG. 7.
Figure 9:
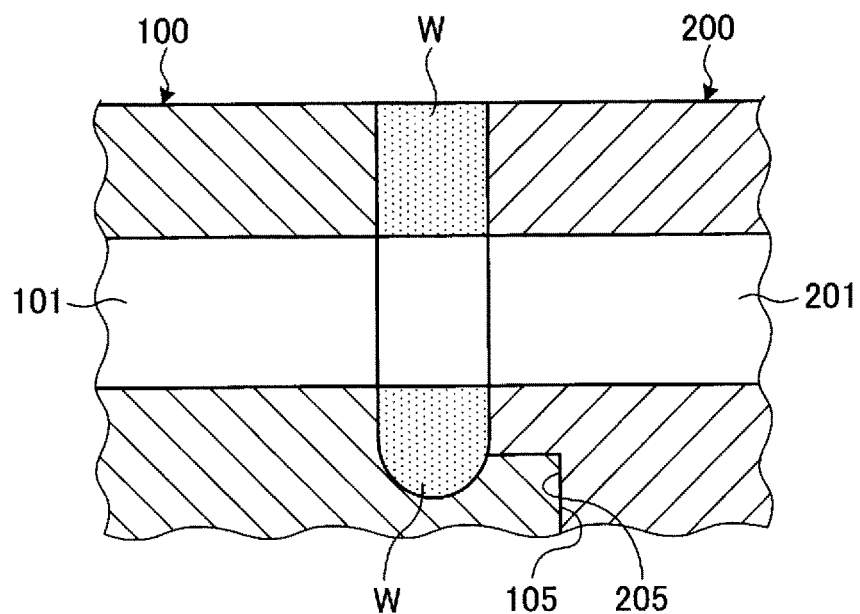
FIG. 9 is a schematic view illustrating the method of manufacturing a tube of the present embodiment.
Figure 10:
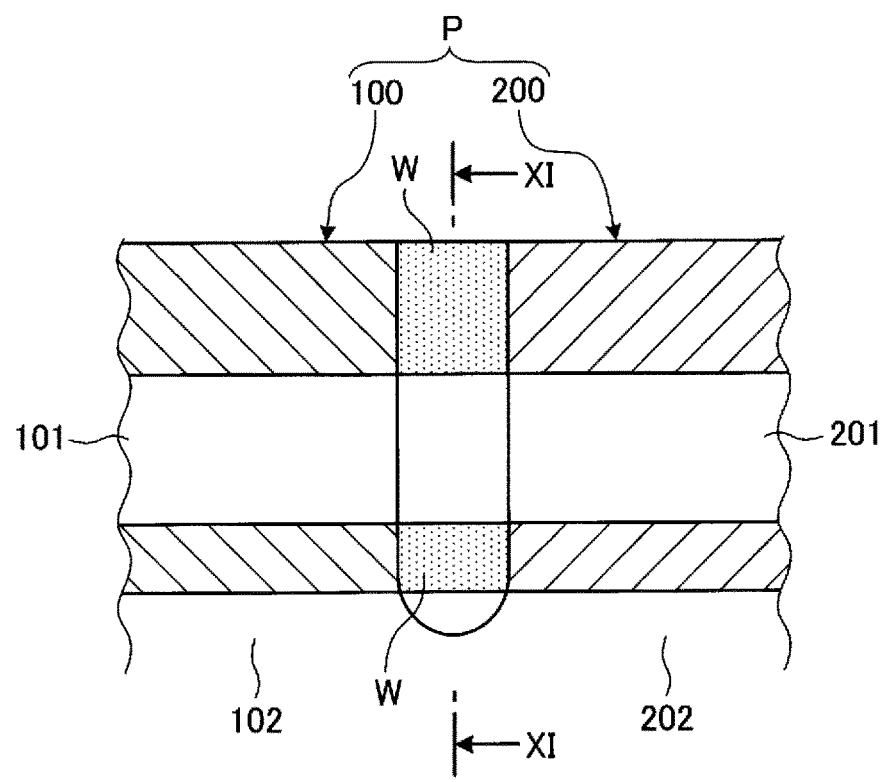
FIG. 10 is a schematic view illustrating the method of manufacturing a tube of the present embodiment.
Figure 11:
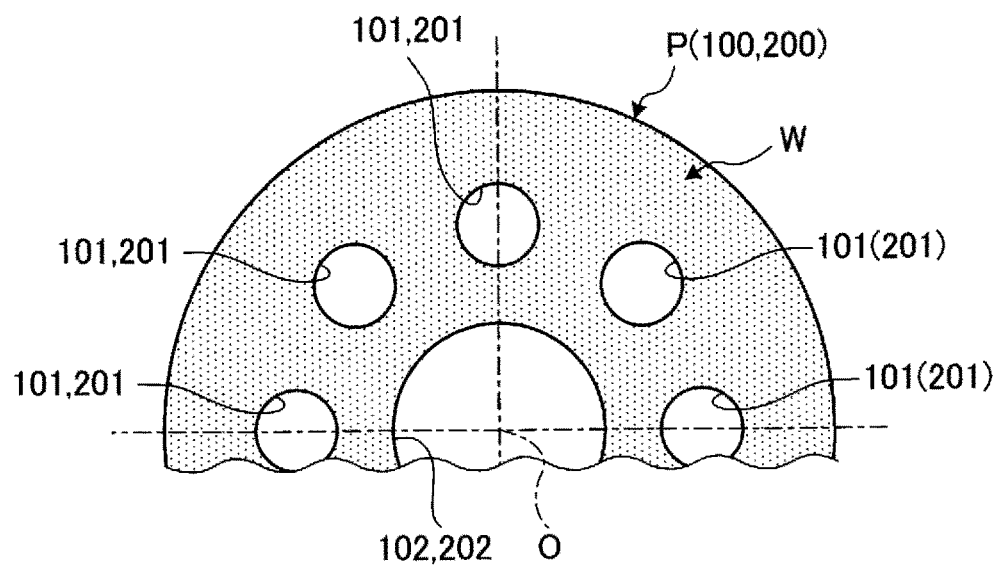
FIG. 11 is a cross-sectional view taken along a line XI-XI in FIG. 10.

FIG. 4 is a schematic view illustrating the method of manufacturing a tube according to the present embodiment. FIG. 5 is a schematic view illustrating the method of manufacturing a tube according to the present embodiment. FIG. 6 is a cross-sectional view taken along the line VI-VI of FIG. 5. FIG. 7 is a schematic view illustrating the method of manufacturing a tube according to the present embodiment. FIG. 8 is a cross-sectional view taken along the line VIII-VIII of FIG. 7. FIG. 9 is a schematic view illustrating the method of manufacturing a tube according to the present embodiment. FIG. 10 is a schematic view illustrating the method of manufacturing a tube according to the present embodiment. FIG. 11 is a cross-sectional view taken along the line XI-XI of FIG. 10.

The method of manufacturing a tube according to the present embodiment is a method by which the first tube body 100, which includes the plurality of holes 101, and the second tube body 200, which includes the plurality of holes 201, are joined in a rectilinear manner. This method comprises the steps of: coupling in position the first tube body 100 and the second tube body 200 by inserting a first end portion of a connecting pin 300 into an end portion of the hole 101 of the first tube body 100 and inserting a second end portion of the connecting pin 300 into an end portion of the hole 201 of the second tube body 200; welding all around the outer circumferential portion of the coupled portion of the first tube body 100 and the second tube body 200 and all around the inner circumferential portion of the holes 101, 201 in which the connecting pin 300 is inserted; and removing the connecting pin 300 remaining inside the hole 101 of the first tube body 100 and the hole 201 of the second tube body 200.

Below, the method of manufacturing a tube according to the present embodiment will be described specifically.

As illustrated in FIG. 4, the first tube body 100 is provided with the plurality of first holes 101, and fitting holes 103 formed on the end portion to the side which is connected. The fitting holes 103 have an inner diameter larger than that of the first holes 101. The fitting holes 103 are disc-shaped, communicate with the first holes 101, and open to an end surface 104 of the first tube body 100 to the side which is connected. The second tube body 200 is provided with the plurality of first holes 201, and fitting holes 203 formed on the end portion to the side which is connected. The fitting holes 203 have an inner diameter larger than that of the first holes 201. The fitting holes 203 are disc-shaped, communicate with the first holes 201, and open to an end surface 204 of the second tube body 200 to the side which is connected.

The first holes 101 of the first tube body 100 are identical in dimension to the first holes 201 of the second tube body 200, and the fitting holes 103 of the first tube body 100 are identical in dimension to the fitting holes 203 of the second tube body 200.

In addition, the first tube body 100 is provided with a cylindrical protruding portion 105 formed on the end surface 104 located more centrally than the plurality of first holes 101. The second tube body 200 is provided with a cylindrical recessed portion 205 formed on the end surface 204 located more centrally than the plurality of first holes 201.

The connecting pin 300 is a solid member and includes a first insert portion 301, which is insertable into the first holes 101 of the first tube body 100, and a second insert portion 302, which is insertable into the first holes 201 of the second tube body 200. Additionally, the connecting pin 300 includes a fitting portion 303 between the pair of insert portions 301, 302. The fitting portion 303 fits with the fitting holes 103, 203 of the tube bodies 100, 200. The fitting portion 303 has a width corresponding to the cumulative depth of the fitting holes 103, 203.

As illustrated in FIG. 5 and FIG. 6, first, the first insert portion 301 of the connecting pin 300 is inserted into the end portion of the first hole 101 of the first tube body 100, and a portion of the fitting portion 303 is inserted into the fitting hole 103 of the first tube body 100. Next, the second insert portion 302 of the connecting pin 300 is inserted into the end portion of the first hole 201 of the second tube body 200, and a portion of the fitting portion 303 is inserted into the fitting hole 203 of the second tube body 200. In this case, the connecting pins 300 are inserted into all of the first holes 101, 201 of the first tube body 100 and the second tube body 200. Also at this time, the protruding portion 105 of the first tube body 100 and the recessed portion 205 of the second tube body 200 engage. Thus, the first tube body 100 and the second tube body 200 are coupled in position with respect to the circumferential direction and the radial direction, with the end surfaces 104, 204 in intimate contact having no gaps therebetween and the first holes 101, 201 communicating with each other while sharing a common center.

Next, the first tube body 100 and the second tube body 200 are joined by welding using the equipment for manufacturing a tube, as illustrated in FIG. 1. In other words, the rotary driving unit 11 rotates the tube P while the laser welding head 12 emits a laser beam at the coupled portion of the tube P to weld all around the tube P. At this time, as illustrated in FIG. 7 and FIG. 8, the laser welding head 12 irradiates with a laser beam B the coupled portion of the end surface 104 of the first tube body 100 and the end surface 204 of the second tube body 200 in intimate contact having no gaps therebetween. The irradiation width of the laser beam B from the laser welding head 12 at this time, i.e. the weld width of the coupled portion of the first tube body 100 and the second tube body 200, is set to a width greater than the length of the fitting portion 303 of the connecting pin 300.

In addition, the laser welding head 12 irradiates with the laser beam B the coupled portion of the first tube body 100 and the second tube body 200 from the outer circumferential portion to a position more centrally located than where the plurality of first holes 101, 201 are formed. The irradiation depth of the laser beam B from the laser welding head 12 is set to a distance from the outer circumferential surface of the tube bodies 100, 200 to a position more centrally located than where the plurality of first holes 101, 201 are formed. As a result, all around the inner circumferential portions of the first holes 101, 201 of the first tube body 100 and the second tube body 200, in which the connecting pins 300 are inserted, can be welded.

In other words, the coupled portion of the first tube body 100 and the second tube body 200 is melted together with the fitting portion 303 of the connecting pin 300 to form the weld portion (melt portion) W encompassing the region outward from the protruding portion 105.

In addition, as illustrated in FIG. 9, the connecting pin 300 remaining inside the first hole 101 of the first tube body 100 and the first hole 201 of the second tube body 200 is removed. The connecting pin 300 remaining inside the first holes 101, 201 is cut to a diameter identical to that of the first holes 101, 201 by a cutting tool (not illustrated) inserted and moved in the longitudinal direction using the first holes 101, 201 as a guide. In other words, the cutting tool, for example, passes from the first hole 101 into the first hole 201, thus cutting not only the connecting pin 300 remaining inside but also the melted and then solidified weld portion W of the connecting pin 300.

Thereafter, the first tube body 100 and the second tube body 200 are connected, all the first holes 101 and the first holes 201 come into a communicative relationship, and as illustrated in FIG. 10 and FIG. 11, the second holes 102, 202 are cut in the center portion of the tube bodies 100, 200 inward of the first holes 101 and first holes 201. Here, the protruding portion 105 of the first tube body 100 and the recessed portion 205 of the second tube body 200 are removed by cutting the tube bodies 100, 200 from the center O to the weld portion W.

As a result, as illustrated in FIG. 2, the tube P is manufactured, the tube P being constituted by the first tube body 100 including the plurality of first holes 101 and second holes 102 and the second tube body 200 including the plurality first holes 201 and second holes 202 joined in a rectilinear manner with the holes 101 and 201 and holes 102 and 202 communicating with each other while sharing a common center, and with the weld portion (melt portion) W formed all around the joint portion of the first tube body 100 and the second tube body 200.

Accordingly, the method of manufacturing a tube according to the present embodiment comprises the steps of:

coupling in position the first tube body 100 and the second tube body 200 by inserting the first insert portion 301 of the connecting pin 300 into the end portion of the first hole 101 of the first tube body 100 and inserting the second insert portion 302 into the end portion of the first hole 201 of the second tube body 200;

welding all around the outer circumferential portion of the coupled portion of the first tube body 100 and the second tube body 200 and all around the inner circumferential portion of the holes 101, 201 in which the connecting pin 300 is inserted; and removing the connecting pin 300 remaining inside the first hole 101 of the first tube body 100 and the first hole 201 of the second tube body 200.

Accordingly, by welding all around the outer circumferential portion of the coupled portion of the tube bodies 100, 200 and all around the inner circumferential portion of the first holes 101, 201 in which the connecting pin 300 is inserted, the melt portion is formed between the first holes 101, 201, which ensures high-performance sealing. In addition, by removing the connecting pin 300 remaining inside the first holes 101, 201 of the tube bodies 100, 200, the tube P of a predetermined length can be easily manufactured.

In the method of manufacturing a tube according to the present embodiment, the connecting pin 300 remaining inside the first hole 101 of the first tube body 100 and the first hole 201 of the second tube body 200 is cut to a diameter identical to that of the first hole 101 of the first tube body 100 and the first hole 201 of the second tube body 200. Thus, the connecting pin 300 remaining inside the first holes 101, 201 can be easily removed using the first holes 101, 201 of the tube bodies 100, 200 acting as a guide. Additionally, by cutting the connecting pin 300 to a diameter identical to that of the first holes 101, 201, highly precise first holes 101, 201 of a predetermined length can be formed.

In the method of manufacturing a tube according to the present embodiment, the first tube body 100 and the second tube body 200 include the fitting holes 103, 203 with an inner diameter larger than that of the first holes 101, 201. The fitting holes 103, 203 are disposed on the end portions of the first holes 101, 201. The connecting pin 300 is provided with the pair of insert portions 301, 302, which are inserted into the first holes 101, 201 of the first tube body 100 and the second tube body 200, and the fitting portion 303, which fits into the fitting holes 103, 203 of the tube bodies 100, 200. The fitting portion 303 is disposed between the pair of insert portions 301, 302. Thus, by the insert portions 301, 302 of the connecting pin 300 being inserted into the first holes 101, 201 of the tube bodies 100, 200 and the fitting portion 303 being fit into the fitting holes 103, 203 of the tube bodies 100, 200, the connecting pin 300 is able to be inserted into the tube bodies 100, 200 an appropriate amount and the tube bodies 100, 200 with the connecting pin 300 disposed inside can be appropriately welded from the outer circumferential portion.

In the method of manufacturing a tube according to the present embodiment, the coupled portion of the first tube body 100 and the second tube body 200 is welded to a width greater than the length of the fitting portion 303 of the connecting pin 300. Thus, all of the fitting portion 303 of the connecting pin 300 melts and then solidifies again to form the melt portion, thus ensuring sealing.

In the method of manufacturing a tube according to the present embodiment, the connecting pin 300 is a solid member. This prevents the first holes 101, 201 from melting and deforming when welding is performed.

In the method of manufacturing a tube according to the present embodiment, the first tube body 100 and the second tube body 200 include the plurality of first holes 101, 201 disposed on the outer circumferential portion side spaced at predetermined intervals in the circumferential direction. The first tube body 100 and the second tube body 200 are welded all around the outer circumferential portion of the coupled portion and all around the inner circumferential portion of the first holes 101, 201 in which the connecting pin 300 is inserted. Thereafter, the center portion of the first tube body 100 and the second tube body 200 is cut to the weld portion W to form the second holes 102, 202 in the center of the tube bodies 100, 200. By thus cutting the center portion of the first tube body 100 and the second tube body 200 to the weld portion W to form the second holes 102, 202, the joint portion of the first tube body 100 and the second tube body 200 constitutes entirely the weld portion W melted and then solidified, which ensures sealing.

In addition, the tube according to the present embodiment is provided with the first tube body 100 including the plurality of first holes 101 and second holes 102 and the second tube body 200 including the plurality of first holes 201 and second holes 202 joined in a rectilinear manner, and the weld portion W provided all around the joint portion of the first tube body 100 and the second tube body 200. Thus, a predetermined length can be ensured, and high-performance sealing between the first holes 101, 201 and the second holes 102, 202 provided inside the tube bodies 100, 200 can be ensured.

Note that in the embodiment described above, the tube P is manufactured by forming the second holes 102, 202 in the center portion after the tube bodies 100, 200 including the plurality of first holes 101, 201 are connected. However, the tube P may be manufactured by connecting the tube bodies 100, 200 that already include the plurality of first holes 101, 201 and second holes 102, 202 in the center portion. In addition, joining the first tube body 100 including the plurality of first holes 101 and second holes 102 and the second tube body 200 including the plurality of first holes 201 and second holes 202 in a rectilinear manner was described. However, a third tube body including a plurality of holes may be joined in a rectilinear manner to the second tube body 200, and the number of tubes joined together is not limited.

In the embodiment described above, the method of manufacturing the tube P in which the tube bodies 100, 200 including the plurality of first holes 101, 201 are joined was described. However, the tube bodies 100, 200 are not limited to this structure. For example, two tube bodies with holes of different diameters or the same diameter formed offset from the center position may be joined to manufacture the tube P.

In addition, in the embodiment described above, the first tube body 100 and the second tube body 200 are coupled with the connecting pin 300 being inserted into the first holes 101, 201, and joined by welding the outer circumferential portion of the coupled portion of the first tube body 100 and the second tube body 200 and the inner circumferential portion of the first holes 101, 201 in which the connecting pin 300 is inserted. However, the connecting pin 300 is not required to be inserted into every hole, and holes without the connecting pin 300 inserted are not required to be welded around the inner circumferential portion.

In the embodiment described above, the connecting pin 300 is constituted by the insert portions 301, 302 and the fitting portion 303. However, the connecting pin 300 may be constituted by only the insert portions.

In the embodiment described above, laser beam welding was employed as the joining means of the first tube body 100 and the second tube body 200. However, the joining means is not limited to laser beam welding. Other suitable means include electron beam welding, YAG laser welding, friction stir welding, and the like.

REFERENCE SIGNS LIST

100 First tube body
101 First hole (peripheral hole)
102 Second hole (central hole)
103 Fitting hole
104 End surface
105 Protruding portion
200 Second tube body
201 First hole (peripheral hole)
202 Second hole (central hole)
203 Fitting hole
204 End surface
205 Recessed portion
300 Connecting pin
301 First insert portion
302 Second insert portion
303 Fitting portion
P Tube

The invention claimed is:

1. A tube, comprising:
a first tube body including a plurality of first peripheral holes and a first central hole;
a second tube body including a plurality of second peripheral holes and a second central hole, the tube bodies being joined at a joint portion in a rectilinear manner; and
a melt portion formed all around the joint portion of the first tube body and the second tube body,
wherein the plurality of first peripheral holes communicate with the plurality of second peripheral holes, and the first central hole communicates with the second central hole, and
the melt portion extends from an outer circumferential surface of the first and second tube bodies more toward the first and second central holes along a radius of the first and second tube bodies than a position where the first and second peripheral holes are formed.

2. A tube, comprising:
a first tube body including a plurality of first peripheral holes and a first central hole;
a second tube body including a plurality of second peripheral holes and a second central hole, the tube bodies being joined at a joint portion in a rectilinear manner; and
a melt portion formed all around the joint portion of the first tube body and the second tube body,
wherein the plurality of first peripheral holes communicate with the plurality of second peripheral holes, and the first central hole communicates with the second central hole, and
the melt portion extends from an outer circumferential surface of the first and second tube bodies to a position between the first and second peripheral holes.

3. The tube as claimed in claim 1, wherein the first and second peripheral holes and the first and second central holes extend in an axial direction of the first and second tube bodies.

4. The tube as claimed in claim 1, wherein the plurality of first peripheral holes communicate with and are aligned with the plurality of second peripheral holes, and the first central hole is aligned with the second central hole.

5. The tube as claimed in claim 2, wherein the first and second peripheral holes and the first and second central holes extend in an axial direction of the first and second tube bodies.

6. The tube as claimed in claim 2, wherein the plurality of first peripheral holes communicate with and are aligned with the plurality of second peripheral holes, and the first central hole is aligned with the second central hole.

* * * * *